US006491523B1

(12) United States Patent
Altman

(10) Patent No.: US 6,491,523 B1
(45) Date of Patent: Dec. 10, 2002

(54) SIGN LANGUAGE INSTRUCTION SYSTEM AND METHOD

(76) Inventor: Janice Altman, 3264 S. Locan Ave., Fresno, CA (US) 93725

( * ) Notice: Subject to any disclaimer, the term of this patent is extended or adjusted under 35 U.S.C. 154(b) by 0 days.

(21) Appl. No.: 09/560,937

(22) Filed: Apr. 28, 2000

(51) Int. Cl.[7] .............................................. G09B 21/00
(52) U.S. Cl. ....................... 434/114; 434/112; 434/156
(58) Field of Search ................................ 434/114, 112, 434/156

(56) References Cited

U.S. PATENT DOCUMENTS

| D218,453 S | 8/1970 | Lasker |
| 3,858,333 A | 1/1975 | Kopp |
| 3,909,001 A | 9/1975 | Feldhausen |
| D242,055 S | 10/1976 | Brown |
| 4,358,278 A | * 11/1982 | Goldfarb ................ 434/337 X |
| 4,799,889 A | 1/1989 | Yockey |
| 4,846,687 A | 7/1989 | White et al. |
| 4,959,017 A | * 9/1990 | Thompson et al. ..... 434/110 X |
| D356,834 S | 3/1995 | Steffensen |
| 5,473,705 A | * 12/1995 | Abe et al. ............... 382/100 X |
| 5,655,910 A | * 8/1997 | Troudet ...................... 434/233 |
| 5,735,693 A | 4/1998 | Groiss |
| 5,803,742 A | 9/1998 | Buti |
| 5,823,782 A | 10/1998 | Marcus et al. |
| 5,855,483 A | * 1/1999 | Collins et al. .......... 434/322 X |
| 5,887,069 A | * 3/1999 | Sakou .................... 382/100 X |
| 5,899,700 A | 5/1999 | Williams et al. |
| 5,967,895 A | 10/1999 | Kellen |
| 5,991,693 A | 11/1999 | Zalewski |
| 6,022,222 A | * 2/2000 | Guinan ................... 434/169 X |

* cited by examiner

Primary Examiner—Joe H. Cheng
Assistant Examiner—Chanda Harris
(74) Attorney, Agent, or Firm—Kolisch, Hartwell, P.C.

(57) ABSTRACT

A system and method for teaching sign language to a student. The method includes pre-recording a presentation on a medium. The presentation has an instruction portion wherein instruction related to a plurality of sign language signs is given, and a game playing portion wherein each of the plurality of signs is presented for recognition by the student. The medium is configured to be displayed on a display device, such as a video player or computing device. The method also includes providing a gaming surface having a plurality of symbols thereon, each of the plurality of symbols corresponding to a sign language sign presented in the game playing portion of the presentation. The method further includes instructing the student to record, in response to each sign displayed during the game playing portion of the presentation, the presence of the symbol corresponding to the displayed sign on the gaming surface.

20 Claims, 5 Drawing Sheets

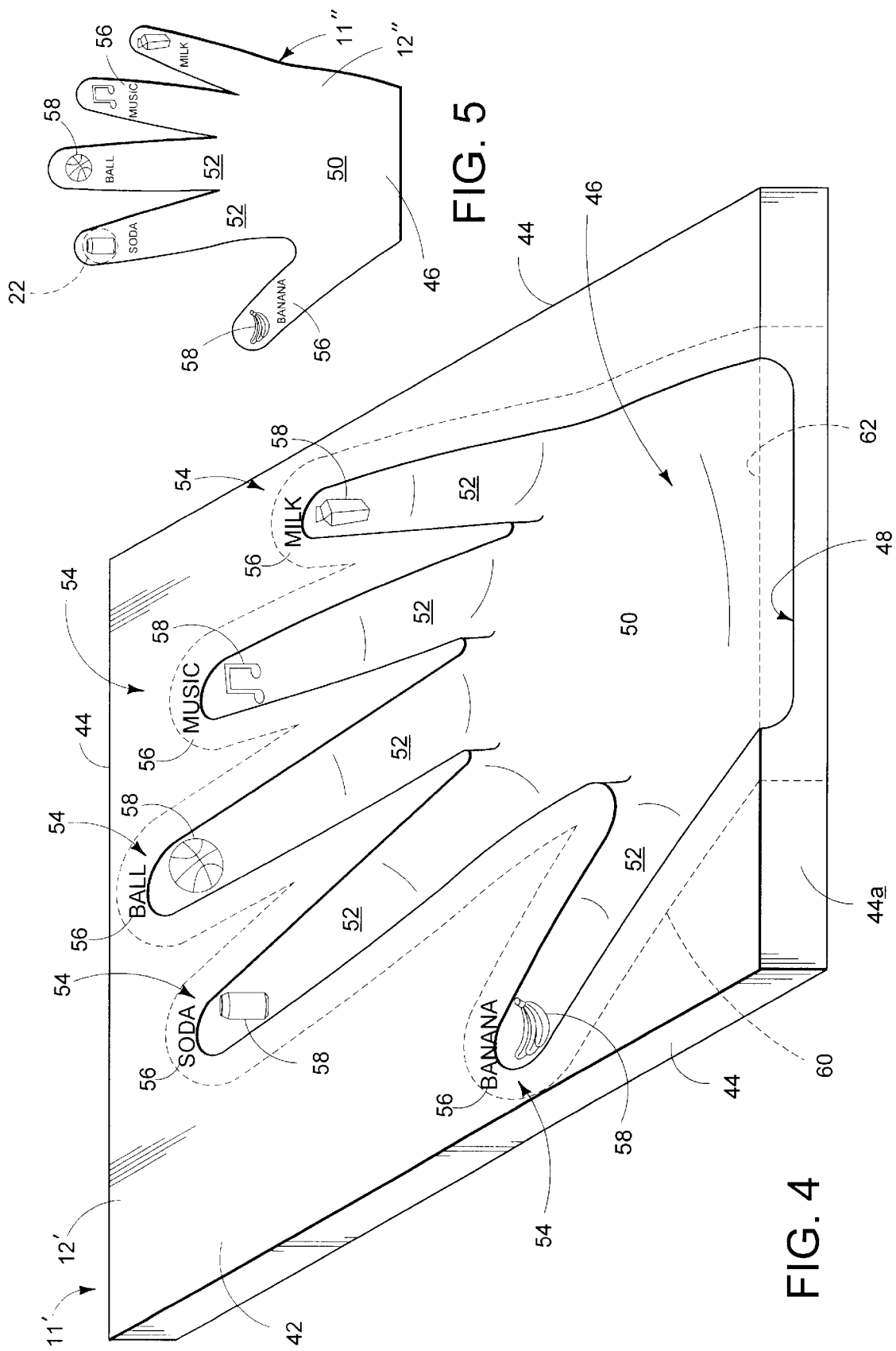

SIGN LANGUAGE INSTRUCTION SYSTEM AND METHOD

TECHNICAL FIELD

This invention relates generally to sign language, and more particularly to a system and method for teaching sign language.

BACKGROUND OF THE INVENTION

Learning sign language is often a difficult, time consuming process. For each sign, the student must master the physical act of signing, and come to associate the sign with a corresponding meaning. In addition, the student must be able to quickly recognize the sign in conversation and recall its meaning. Typically, students spend countless hours attending classes and studying textbooks in order to gain a minimum competency in sign language. These hours can be tedious, and therefore it would be desirable to provide an entertaining and educational method for instructing sign language to make learning sign language more enjoyable.

SUMMARY OF THE INVENTION

A system and method for teaching sign language to a student are provided. The method typically includes prerecording a presentation on a medium. The presentation has an instruction portion wherein instruction related to a plurality of sign language signs is given, and a game playing portion wherein each of the plurality of signs is presented for recognition by the student. The medium is configured to be displayed on a display device, such as a video player or computing device. The method also includes providing a gaming surface having a plurality of symbols thereon, each of the plurality of symbols corresponding to a sign language sign presented in the game playing portion of the presentation. The method further includes instructing the student to record, in response to each sign displayed during the game playing portion of the presentation, the presence of the symbol corresponding to the displayed sign on the gaming surface.

The system includes a medium configured to be displayed on a display device. The system also includes a presentation stored on the medium. The presentation typically has an instruction portion wherein instruction related to a plurality of sign language signs is given, and a game playing portion wherein each of the plurality of signs is presented for recognition by a student. The system further includes a gaming surface having a plurality of symbols thereon. Each of the plurality of symbols corresponds to a sign language sign presented in the game playing portion of the presentation.

According to another aspect of the invention, the system may include a video recording configured to be displayed on a display device and a presentation stored on the video recording. The presentation typically includes a plurality of game segments. Each game segment has an instruction portion wherein instruction related to a set of sign language signs is given, and a game playing portion wherein each of the set of signs is presented for recognition by a student. The system further includes a gaming surface having a plurality of symbol regions. Each symbol region contains at least one symbol corresponding to a sign language sign presented in the game playing portion of the presentation. Each of the symbol regions is configured to receive a respective game piece to record the presence of a corresponding sign in the game playing portion of the presentation.

BRIEF DESCRIPTION OF THE DRAWINGS

FIG. 4 is an isometric view of a gaming surface according to another preferred embodiment of the present invention.

FIG. 5 is a top view of a gaming surface according to yet another preferred embodiment of the invention.

DETAILED DESCRIPTION OF THE PREFERRED EMBODIMENTS

Figure 1:
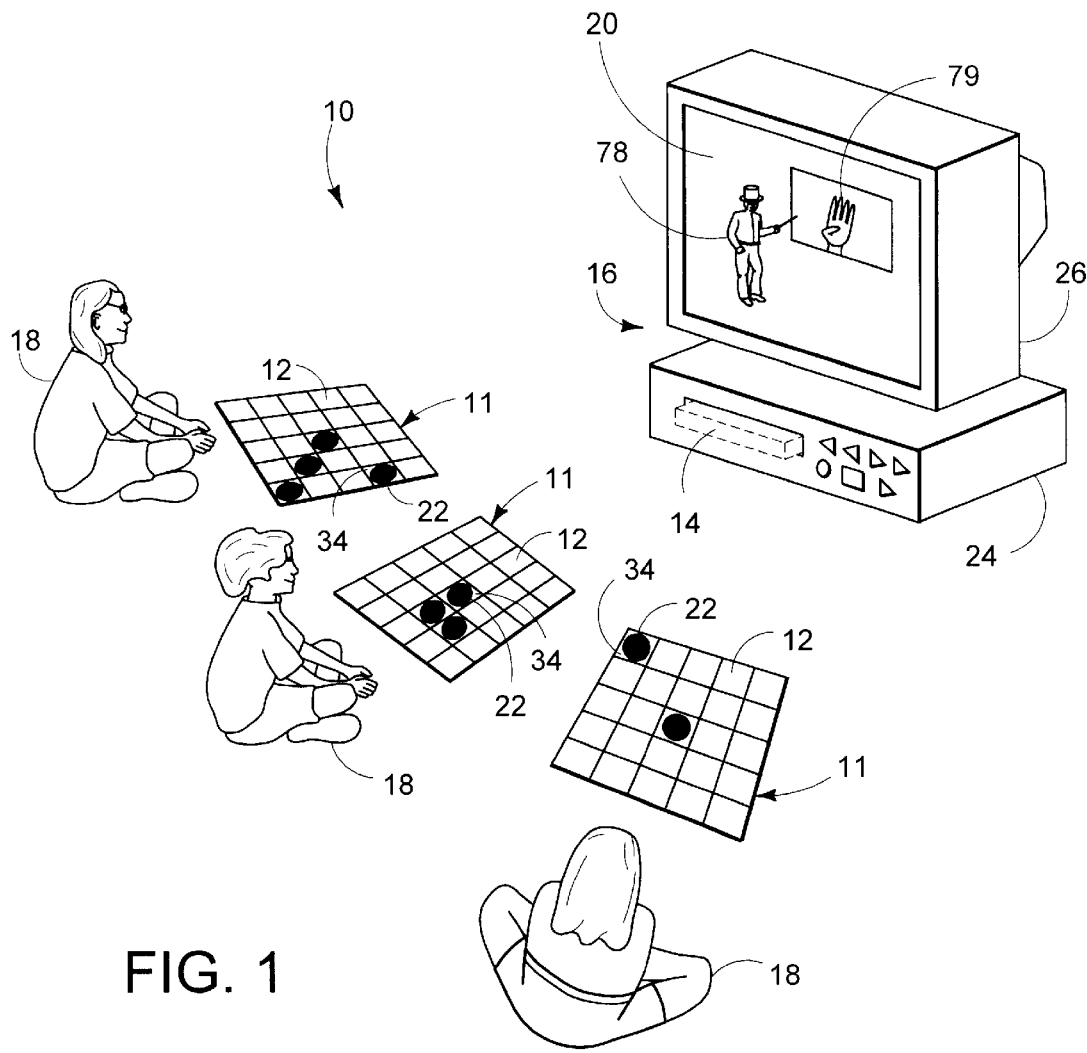
FIG. 1 is a perspective view of a sign language instruction system according to a preferred embodiment of the present invention.

Referring initially to FIG. 1, a sign language instruction system according to one preferred embodiment of the invention is shown generally at 10. Sign language instruction system 10 typically includes a plurality of gaming apparatuses 11 having respective gaming surfaces 12, and a presentation storage medium 14, such as a videocassette, digital video disk, laser disk, etc., configured to be displayed on display device 16 to a plurality of students 18. Medium 14 typically contains a presentation 20 designed to instruct students 18 in sign language. When a student recognizes a sign in presentation 20, the student typically responds by placing a game piece 22 over a symbol containing region 34 containing a symbol 36 (see FIG. 3) corresponding to the sign, as described below.

Display device 16 typically includes a video player 24 and an associated video display 26. Typically, video player 24 is a videocassette player, however it will be understood that a digital video disk player, laser disk player, or other suitable video player may also be used. Video display 26 is typically a television. Alternatively, another suitable type of video display 26 may be used, such as a video monitor that does not include a television tuner.

Figure 2:
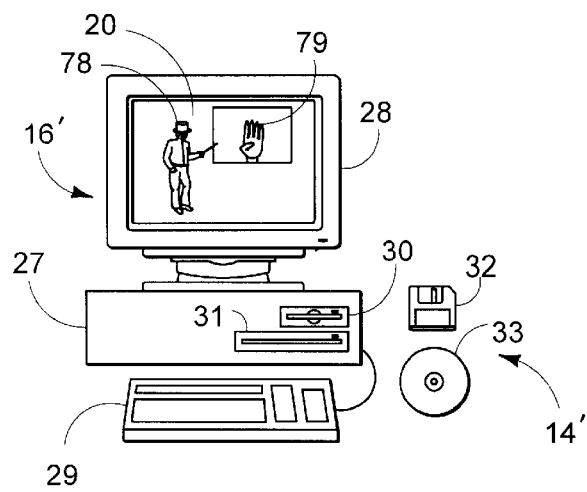
FIG. 2 is a front view of a display device of a sign language instruction system according to another preferred embodiment of the present invention.

As shown in FIG. 2, in another preferred embodiment of the invention, display device 16 is a computing device 16' and presentation medium 14 is a computer readable medium 14'. Typically, computing device 16' includes a processing unit 27, and an associated display monitor 28 and keyboard 29. Processing unit 27 includes a storage drive, such as a "floppy" drive 30 or CD ROM drive 31 configured to read a computer readable medium such as floppy disk 32 or CD ROM 33. Alternatively, the storage drive may be a hard drive, optical drive, or other suitable storage drive. Processing unit 27 is configured to load computer-executable instructions from medium 14' into memory and execute these instructions accordingly to display presentation 20 on monitor 28.

Figure 3:
FIG. 3 is a top view of a gaming surface of the sign language instruction system of FIG. 1.

As shown in FIG. 3, gaming apparatus 11 typically is a game board, and gaming surface 12 is formed on top of the game board. Gaming surface 12 includes a plurality of symbol regions 34, each symbol region having one or more associated symbols 36 corresponding to a sign language sign taught on presentation 20. Typically, symbols 36 include pictorial symbols 38 and word symbols 40. In addition, symbols 36 may include virtually any type of symbol, including virtually any combination of letters, numbers, icons, pictures, colors, etc., having a meaning associated with a sign language sign taught in presentation 20. A free space 41 may be provided, which students may cover with game piece 22 at the start of the game.

While typically each symbol 26 on gaming surface 12 has a corresponding sign taught on presentation 20, it will be appreciated that certain symbols may be included on the gaming surface 12 even though they are not taught in the presentation, thereby increasing the difficulty of the game. While typically symbols 36 are formed flush with gaming surface 12, it will be appreciated the symbols may also be textured, or written in Braille or other touch-identifiable writing system.

In FIG. 4, a gaming apparatus according to another preferred embodiment of the invention is shown at 11'. Gaming apparatus 11' typically includes a gaming surface 12' having a top 42 and sides 44. Typically, top 42 is planar and sides 44 form a rectangle. Alternatively, top 42 and sides 44 each may be curved, polygonal, textured or some other predetermined two or three-dimensional shape. For example, the sides may be hand-shaped, as illustrated at dashed line 60.

Gaming surface 12' also typically includes a hand-receiving portion 46. Typically, hand-receiving portion 46 includes a depression 48 at least partially open to a front side 44a of the gaming apparatus. Alternatively, the hand-receiving portion may be planar without any depression, as shown at dashed line 62, or may be outwardly curved or some other predetermined shape suitable to be covered by a hand. Hand-receiving portion 46 typically includes a palm region 50 and a plurality of digit regions 52. Symbols 54 such as word symbol 56 and pictorial symbol 58 typically are positioned adjacent a distal end of each of the digit regions. Typically, word symbols 56 are positioned outwardly adjacent the distal ends of the digit regions and pictorial symbols 58 are positioned inwardly adjacent the distal ends of the digit regions, such that the digits of the user's hand selectively may cover the pictorial symbol in each of digit regions 52. Alternatively, both of the symbols 56, 58 may be positioned either inside or outside digit regions 52. Gaming apparatus 11" typically is formed from wood, plastic, cardboard, or other suitable material.

In FIG. 5, a gaming apparatus according to another preferred embodiment of the invention is shown at 11". Gaming apparatus 11' typically includes a hand-shaped gaming surface 12", including a hand-receiving portion 46 having a palm region 50 and digit regions 52. Word symbols 56 and pictorial symbols 58 are positioned adjacent a distal end of each of the digit regions 52. Gaming apparatus 11" typically is formed from a sheet of rigid material, such as wood, plastic, or cardboard. On each of apparatuses 11', 11", a student may position a hand on the apparatus with the palm over palm region 50, and with the fingers curled such that symbols 54, 56 are visible. Upon recognizing a sign in presentation 20, the student covers the corresponding symbol on gaming apparatus 11', 11" by extending the finger into the associated digit region 52. This typically continues until all five of the student's digits cover symbols. It also will be appreciated that game piece 22 may be used with gaming apparatuses 11' and 11" to record recognized signs, instead of using the student's digits.

Figure 6:
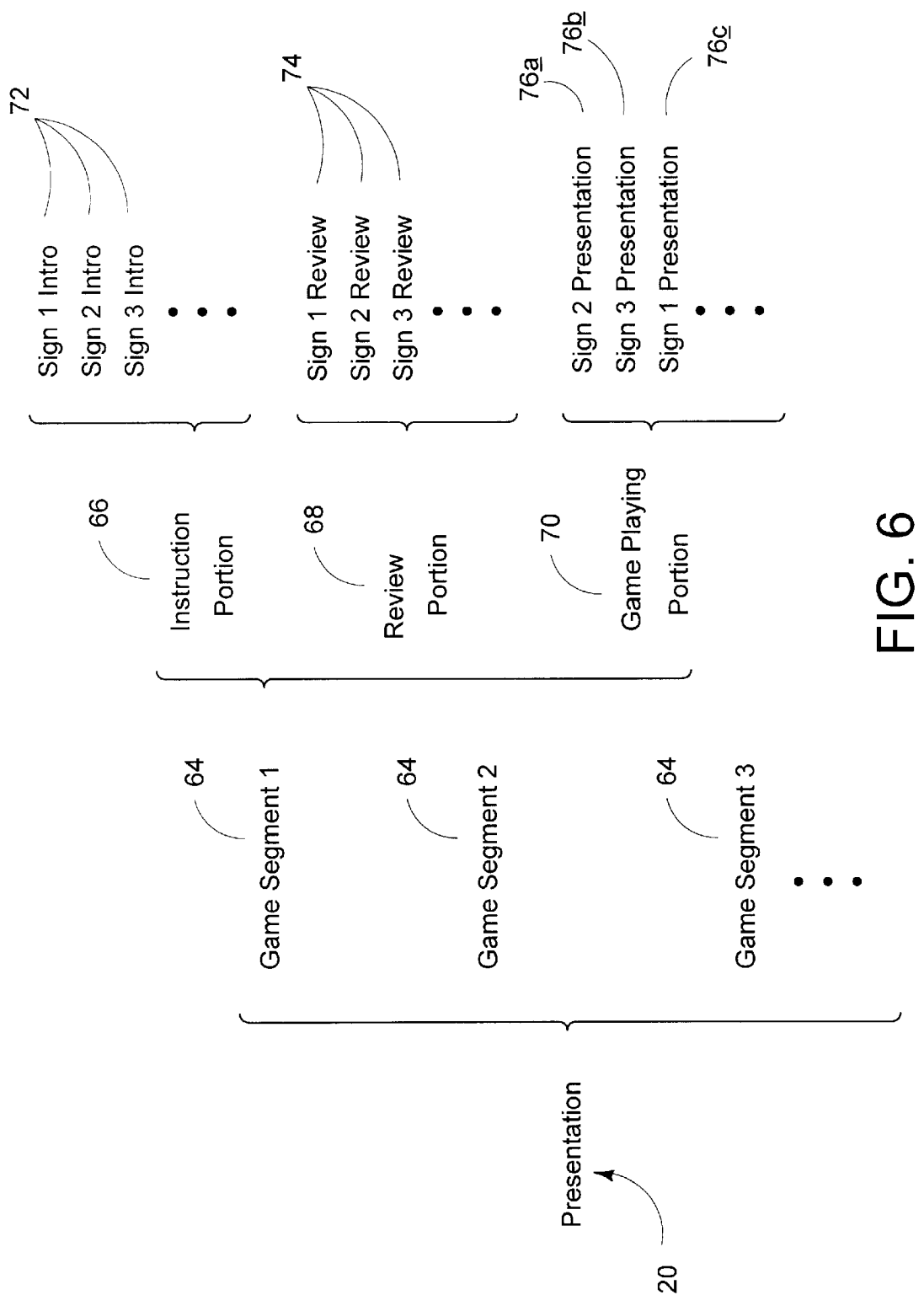
FIG. 6 is a schematic view of a presentation of the sign language instruction system of FIG. 1.
Figure 7:
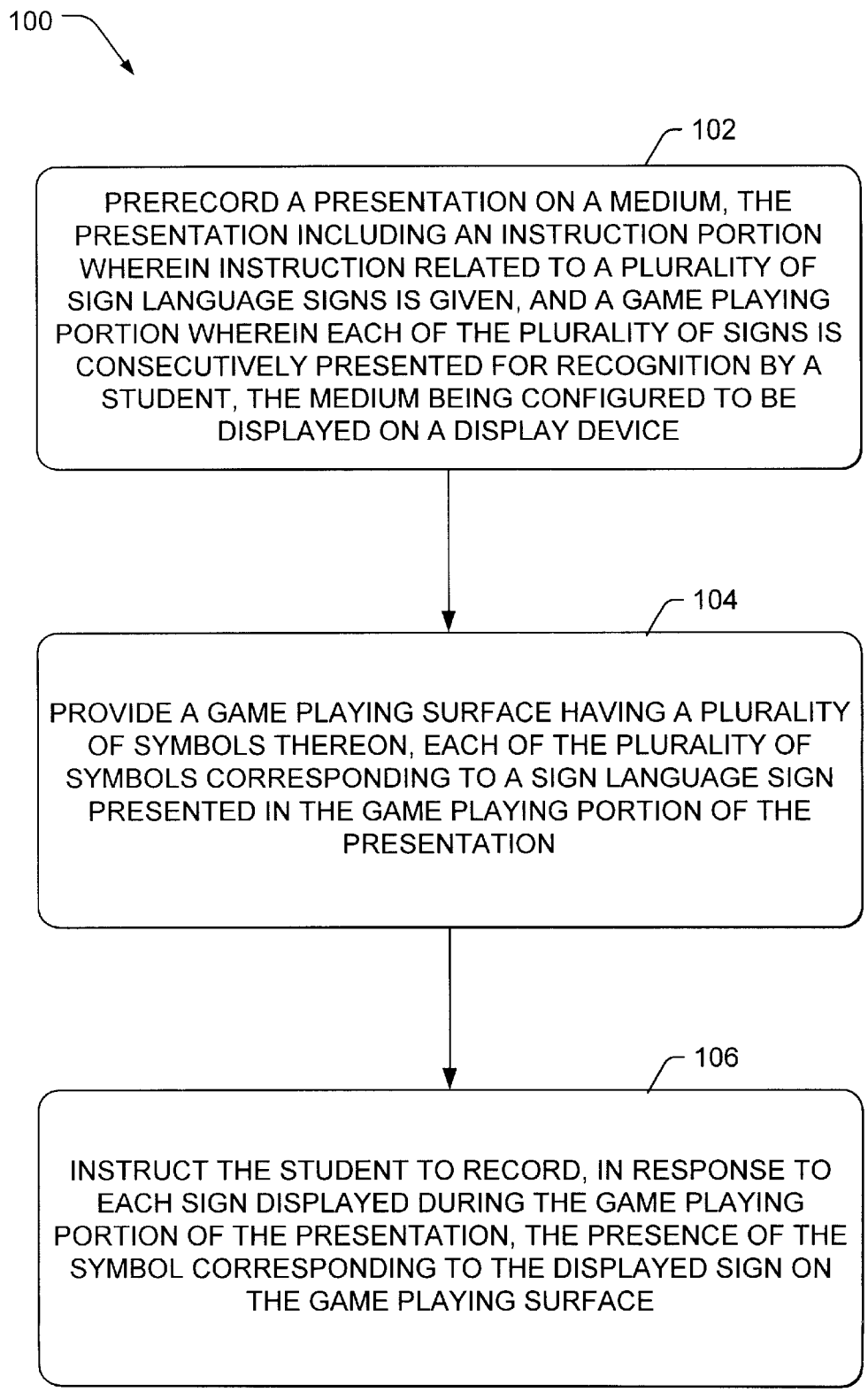
FIG. 7 is a flowchart of a method for use in instructing sign language, according to a preferred embodiment of the invention.

As shown in FIG. 6, presentation 20 typically includes a plurality of game segments 64. For ease of use, the background of each game segment within the presentation may be distinctly colored, such that a user quickly may identify the beginning of a game segment when fast-forwarding from game segment to game segment.

Each game segment 64 typically includes an instruction portion 66, a review portion 68, and a game playing portion 70. Instruction portion 66 includes an introduction 72 to each of a plurality of sign language signs. In each introduction 72, an instructor 78 typically demonstrates several times how to sign the sign language sign, shown in detail at 79, and explains the meaning associated with the sign. The instructor may also present a brief history associated with the sign, common phrases that incorporate the sign, or other information related to the sign. The explanation and brief history may be presented in textual form for the hearing impaired. Sign language also may be used to explain new signs to more advanced students.

Review portion 68 typically includes a review 74 of each of the signs taught in instruction portion 66. Typically, review 74 includes a single demonstration of the sign, and a single explanation of the meaning of the sign. Alternatively, the game segment may not include a review portion.

Game playing portion 70 typically includes a sign presentation 76 of each sign taught in instruction portion 66 and reviewed in review portion 68. Typically, the instructor 78 presents the signs in a random order, as shown at 76a–76c, although virtually any suitable predetermined order may be used. Typically, all of the signs in instruction portion 66 and review portion 68 are presented during game playing portion 70. Alternatively, only a predetermined subset of the signs from the instruction portion 66 and review portion 68 may be presented in game playing portion 70. In addition, signs from previous game segments may be presented during the game playing portion. For example, a first set of signs may be taught in game segment 1, a second set of signs taught in game segment 2, a third set of signs taught in game segment 3, and the game-playing portion of game segment 3 may include signs from each of game segments 1–3. Cumulative presentation increases the student's ability to recall signs learned in earlier game segments.

As the instructor presents the signs in sign presentations 76a–76c, students attempt to recognize each of the presented signs. Upon recognizing the presented sign, the student typically places a game piece 22 on the appropriate symbol region 34 containing the symbol 36 that has a meaning corresponding to the presented sign. The first student to place game pieces on a predetermined subset of the symbol regions 34 wins the game. Typically, the predetermined subset is any row or column of gaming surface 12. For the embodiments of the invention shown at 12' and 12", students cover symbols with their fingers, and the game is won by covering symbols located adjacent each of the five digit regions 52. Alternatively, virtually any other suitable predetermined subset of symbol regions may be used to determine a winner, or the game may not have a winner, and may continue until all of the symbols are covered on the gaming surface 12 of every student.

Referring now to FIG. 6, a method for teaching sign language to one or more students according to one preferred embodiment of the present invention is shown generally at 100. At 102, the method typically includes pre-recording a presentation 20 on a medium 14. Presentation 20 includes an instruction portion wherein instruction related to a plurality of sign language signs is given, and a game playing portion wherein the each of the plurality of signs is presented for recognition by each student, as described above. Presentation 20 may also include a review portion, as described above.

The medium is configured to be displayed on a display device 16. Typically, the display device is a video display, and the medium is a video recording configured to be displayed on the video display via an associated video player. The video recording may be a videocassette, digital video disk, laser disk, etc., as described above. Alternatively, the display device may be a computing device having a monitor, and the medium may include software configured to be displayed on the monitor. The software may be stored on a CD ROM, floppy disk, optical disk, magnetic disk, PROM cartridge, or other computer readable medium, as described above, or may be downloaded from a computer network, such as the Internet.

At 104, the method typically includes providing a gaming surface having a plurality of symbols 36 thereon. The symbols may be word symbols 38, pictorial symbols 40, or virtually any other symbol capable of conveying meaning to the student. Each of the plurality of symbols 36 corresponds to a sign language sign 79 presented in the game playing portion 70 of the presentation 20. As described above, the gaming surface may be formed as indicated at 12, 12', or 12", or in some other suitable manner.

At 106, the method typically includes instructing each student to record, in response to each sign displayed during the game playing portion of the presentation, the presence of a symbol corresponding to the displayed sign on the gaming surface 12, at least until one of the students has recorded a predefined subset of the symbols on the gaming surface 12.

While the present invention has been particularly shown and described with reference to the foregoing preferred embodiments, those skilled in the art will understand that many variations may be made therein without departing from the spirit and scope of the invention as defined in the following claims.

I claim:

1. A method for teaching sign language to a student, the method comprising:
    pre-recording a presentation on a medium, the presentation including an instruction portion wherein instruction related to a plurality of sign language signs is given, and a game playing portion wherein each of the plurality of signs is presented for recognition by the student, the medium being configured to be displayed on a display device;
    providing a game board with a gaming surface divided into a plurality of symbol regions, each symbol region having a symbol positioned therein, each of the symbols being a pictorial or word representation of a sign language sign presented in the game playing portion of the presentation; and
    instructing the student to record, in response to each sign displayed during the game playing portion of the presentation, the presence of the symbol corresponding to the displayed sign on the gaming surface, by covering the symbol with a game piece.

2. The method of claim 1, wherein the display device is a video display, and the medium includes a video recording configured to be displayed on the video display via an associated video player.

3. The method of claim 2, wherein the medium is a medium chosen from the group consisting of videocassette, digital video disk, and laser disk.

4. The method of claim 1, wherein the display device is a computing device including a monitor and a processing unit, and the medium includes computer-executable software configured to display the presentation on the monitor.

5. The method of claim 4, wherein the medium is a medium selected from the group consisting of CD ROM, optical disk, magnetic disk, and PROM cartridge.

6. The method of claim 1, wherein the presentation includes a plurality of game segments, each game segment having a respective instruction portion and a respective game playing portion, the game playing and instruction portions of each game segment, respectively, including introductions to and presentations of a plurality of sign language signs.

7. The method of claim 1, wherein the method includes providing a plurality of game-playing surfaces for a single presentation.

8. The method of claim 7, further comprising providing each student with a respective gaming surface.

9. The method of claim 1, wherein the gaming surface includes a hand-receiving portion configured to be at least partially covered by the hand of a student.

10. The method of claim 1, wherein the gaming surface is hand-shaped.

11. The method of claim 1, wherein the presentation further includes a review portion including a review of the signs taught in the instruction portion of the presentation.

12. The method of claim 1, wherein the student who first records the presence of all of the symbols within a pre-defined subset, wins.

13. The method of claim 1, wherein the symbols include pictorial symbols.

14. The method of claim 1, wherein the symbols include word symbols.

15. A method for teaching sign language to a student, the method comprising:
    pre-recording a presentation on a medium, the presentation including an instruction portion wherein instruction related to a plurality of sign language signs is given, and a game playing portion wherein each of the plurality of signs is presented for recognition by the student, the medium being configured to be displayed on a display device;
    providing a gaming surface having a plurality of symbols thereon, each of the plurality of symbols corresponding to a sign language sign presented in the game playing portion of the presentation; and
    instructing the student to record, in response to each sign displayed during the game playing portion of the presentation, the presence of the symbol corresponding to the displayed sign on the gaming surface;
    wherein the gaming surface includes a hand-receiving portion configured to be at least partially covered by the hand of a student; and
    wherein the hand-receiving portion includes a depression.

16. A method for teaching sign language to a student, the method comprising:
    pre-recording a presentation on a medium, the presentation including an instruction portion wherein instruction related to a plurality of sign language signs is given, and a game playing portion wherein each of the plurality of signs is presented for recognition by the student, the medium being configured to be displayed on a display device;
    providing a gaming surface having a plurality of symbols thereon, each of the plurality of symbols being a pictorial or word representation of a sign language sign presented in the game playing portion of the presentation; and
    instructing the student to record, in response to each sign displayed during the game playing portion of the presentation, the presence of the symbol corresponding to the displayed sign on the gaming surface;

wherein the gaming surface includes a hand-receiving portion configured to be at least partially covered by the hand of a student; and wherein the hand-receiving portion includes a palm region and a plurality of digit regions.

17. The method of claim 16, wherein a symbol is positioned adjacent each respective digit region.

18. A sign language instruction system for use with a display device, the system comprising:

a medium configured to be displayed on the display device;

a presentation stored on the medium, the presentation including an instruction portion wherein instruction related to a plurality of sign language signs is given, and a game playing portion wherein each of the plurality of signs is presented for recognition by a student;

a game board with a gaming surface divided in grid fashion into a plurality of symbol regions, each symbol region having a symbol positioned therein, each of the symbols being a pictorial or word representation of a sign language sign presented in the game playing portion of the presentation; and at least one game piece configured to cover a symbol on the game board.

19. The system of claim 18, wherein the medium is selected from the group consisting of videocassette, digital video disk, laser disk, CD-ROM, floppy disk, optical disk, and magnetic disk.

20. A sign language instruction system for use with a display device, the system comprising:

a video recording configured to be displayed on the display device;

a presentation stored on the video recording, the presentation including a plurality of game segments, each game segment having an instruction portion wherein instruction related to a set of sign language signs is given, and a game playing portion wherein each of the set of signs is presented for recognition by a student; and a substantially flat game board having a gaming surface having a plurality of symbol regions arranged in a grid pattern, each symbol region containing at least one symbol, each of the symbols being a pictorial or word representation of a sign language sign presented in the game playing portion of the presentation, each of the symbol regions being configured to receive a respective game piece to record the presence of a corresponding sign in the game playing portion of the presentation.

* * * * *